July 24, 1923.

A. A. SMITH ET AL 1,462,666

TIRE CHAIN LOCK AND ELASTIC TAKE-UP

Filed June 15, 1922

Arthur A. Smith
Harry W. Paine
INVENTOR

WITNESSES

BY

ATTORNEY

Patented July 24, 1923.

1,462,666

UNITED STATES PATENT OFFICE.

ARTHUR A. SMITH AND HARRY W. PAINE, OF EAGLE GROVE, IOWA.

TIRE-CHAIN LOCK AND ELASTIC TAKE-UP.

Application filed June 15, 1922. Serial No. 568,520.

*To all whom it may concern:*

Be it known that we, ARTHUR A. SMITH and HARRY W. PAINE, citizens of the United States, residing at Eagle Grove, in the county of Wright and State of Iowa, have invented a new and useful Tire-Chain Lock and Elastic Take-Up, of which the following is a specification.

This invention has reference to an improvement in automobile tire chain locks and elastic take-ups, as described in our Patent No. 1,374,771, dated April 12th, 1921, and has for its object the provision of means for maintaining the elastic take-up in such a position that the tire chain lock may be released and held in open position until the chain has been properly applied, whereupon the elastic take-up may be relieved of its tension and the chain lock released to normal locking position.

The invention will be best understood from a consideration of the following detailed description taken in connection with the accompanying drawing forming part of this specification, with the understanding however, that the invention is not confined to any strict conformity with the showing in the drawing, but may be changed and modified so long as such changes and modifications mark no material departure from the salient features of the invention as expressed in the appended claims.

Figure 1:
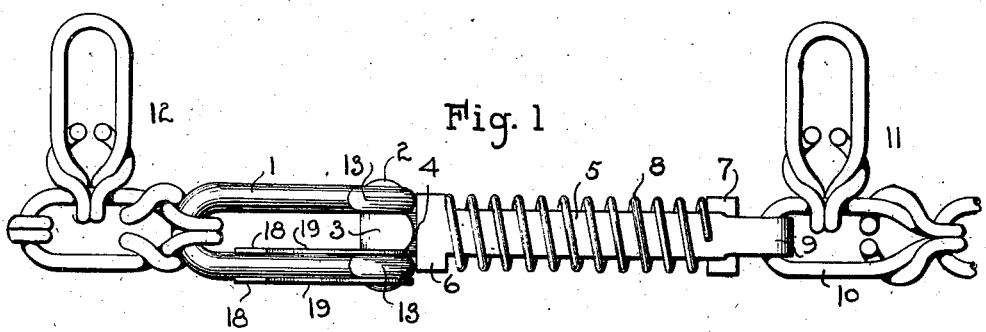
Figure 1 is a plan view of a tire chain lock and elastic take-up with our invention applied thereto.
Figure 2:
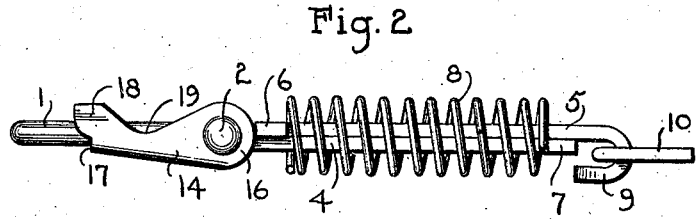
Figure 2 is a side view of the same with the retaining means for holding the chain lock in open position, located in an inoperative position.
Figure 3:
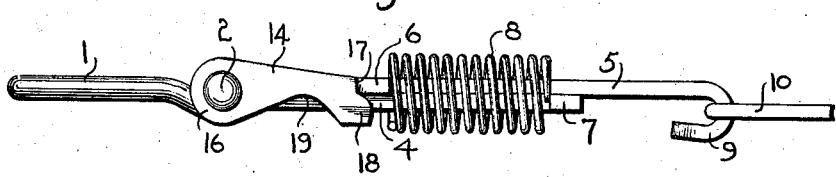
Figure 3 is a side view of the same, with the retaining means in an operative position showing the chain lock in an open position.
Figure 4:
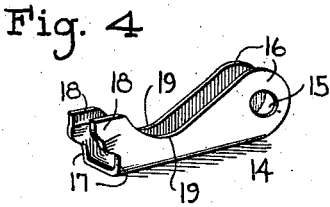
Figure 4 is a view in perspective of the retaining means.

Referring to the drawing, the tire chain lock and elastic take-up, as described and claimed in our former patent, comprises a link 1 having its free ends connected by a bolt or pintle 2 to a hook 3, formed integrally on one end of a slide bar 4, upon which is movable lengthwise, and in substantial contact throughout its length, a second slide bar 5 having laterally-projecting lugs forming with the end of the slide a T-shaped head. The slide 4 is lengthwise provided with laterally projecting lugs 7, forming a T-shaped head on the end of said slide. A coiled spring 8, surrounding the slides 4 and 5, has its opposite ends engaged by the spaced heads or lugs 6 and 7 of the respective slides, and tending to force said bars in opposite directions.

On the end of the slide 5 is formed a link-receiving hook 9 adapted to receive a link 10 of a portion 11 of an anti-skid chain. The portion 12 of the anti-skid chain is secured to the link 1.

The T-shaped head 7 of the slide bar 5 projects into the mouth of the hook 9 and prevents the link 10 from becoming disengaged from said hook.

The hook 3 is embraced between the eyes 13 of the link 1 and has its end sufficiently depressed to prevent the hook from becoming disengaged from the pintle 2.

As described, the invention does not differ from that shown in our aforesaid patent. The improvement consists in the following:

Pivotally mounted on the pintle 2, and embracing one of the eyes 13, and a slide bar of the link 1, is a channel latch member 14 having perforations 15 in the enlarged wings 16 of the channel member to receive the pintle 2. The channel member is cut away at its free end, as at 17, to form a shoulder. This shoulder is adapted to abut the T-head 6 of the slide bar 5, when the spring 8 has been sufficiently compressed between the approaching T-shaped heads, and the retaining latch means 14 has been swung outwardly from its engagement with the bar of the link 1 and substantially in line with the slide bar. The extensions 18 rising outwardly from the shoulder 17 provide a seat for the underside of the lug 6, and aid in maintaining said lug in engagement with the shoulder 17. These extensions further form spring jaws adapted to grip the bar of the link 1 and retain the member 14 locked in its inoperative position. Between said extensions and the enlarged wings 16 of the retaining means 14, the metal is cut away as at 19 for the purpose of lessening the weight of the retaining means, but yet leaving sufficient metal in the device to form a reliable and rigid retaining means for holding the slide bars in open position against the force of the spring 8.

In applying the device, the portion 12 of the tire chain is rigidly held in position, as by placing the foot upon said portion, and then by pulling on the hook 9 the spring 8 is compressed sufficiently between the approaching T-shaped heads to permit the shoulder 17 of the retaining means 14 to be engaged by the lug 6 and securely hold the slide bars in their contracted position against the pressure of said spring, whereupon the link 10 may be readily engaged with the hook 9, as the locking head 7 of the slide bar 4 is then held out of engagement with said hook by retaining means. When this has been accomplished, the latch means 14 may be released, and the slide bar will then resume its normal position with the head 7 locking the link 10 in the hook.

By the engagement of the latch means 14 with the link 1, the latch is held out of the way. It snaps readily onto the bar of the link and is held there until wanted again. It makes a valuable addition to the patented improvement.

What is claimed is:

1. The combination of a tire chain lock and elastic take-up, comprising oppositely movable bars in face to face engagement, each bar terminating at its opposite ends in a hook and a T-shaped head, the head of one bar being normally located in the mouth of an adjacent hook on the other bar, a link connected to the other hook, a spring surrounding the two bars between the heads of the respective bars, and means pivotally mounted on the connection between said link and bar and adapted to engage the head on the other bar to retain the spring compressed and maintain the head out of engagement with the adjacent hook.

2. The combination of a tire chain lock and elastic take-up, comprising oppositely movable bars in face to face engagement, each bar terminating at its opposite ends in a hook and a T-shaped head, the head of one bar being normally located in the mouth of an adjacent hook on the other bar, a link connected to said other bar, a spring surrounding the two bars between the heads of the respective bars, and latch means pivotally mounted on the connection between said link and bar and adapted to engage the head on the other bar to retain the spring compressed and maintain the head out of engagement with said hook, and means on the latch means for engaging a bar of the link to lock the pivoted means in an inoperative position.

3. The combination of a tire chain lock and elastic take-up, comprising oppositely movable bars in face to face engagement, each bar terminating at its opposite ends in a hook and a T-shaped head, the head of one bar being normally located in the mouth of an adjacent hook on the other bar, a link connected to said other bar, a spring surrounding the two bars between the heads of the respective bars, and a channel shaped latch member pivotally mounted on the connection between said link and bar and adapted to engage the head on the other bar to retain the spring compressed and maintain the head out of engagement with said hook, the sides of the channel-shaped member adapted to embrace and grip a side of the link for locking the member in an inoperative position.

4. The combination of a tire chain lock and elastic take-up, comprising oppositely movable bars in face to face engagement, each bar terminating at its opposite ends in a hook and a T-shaped head, the head of one bar being normally located in the mouth of an adjacent hook on the other bar, a link connected to said other bar, a spring surrounding the two bars between the heads of the respective heads, and a channel-shaped latch member pivotally connected to and embracing the link, said member having a shoulder on the free end engageable with the head of a bar adjacent the link for retaining the spring compressed, and spring jaws on the channel member gripping the side bar of the link to prevent disengagement of the latch member from the link when in an inoperative position.

In testimony, that we claim the foregoing as our own, we have hereto affixed our signatures.

ARTHUR A. SMITH.
HARRY W. PAINE.